United States Patent
Nakayama et al.

(10) Patent No.: US 12,547,838 B2
(45) Date of Patent: Feb. 10, 2026

(54) SENTIMENT ANALYSIS SYSTEM, SENTIMENT ANALYSIS METHOD, AND INFORMATION STORAGE MEDIUM

(71) Applicant: RAKUTEN GROUP, INC., Tokyo (JP)

(72) Inventors: Yuki Nakayama, Tokyo (JP); Koji Murakami, Eastchester, NY (US)

(73) Assignee: RAKUTEN GROUP, INC., Tokyo (JP)

( * ) Notice: Subject to any disclaimer, the term of this patent is extended or adjusted under 35 U.S.C. 154(b) by 213 days.

(21) Appl. No.: 18/458,107

(22) Filed: Aug. 29, 2023

(65) Prior Publication Data

US 2024/0070398 A1  Feb. 29, 2024

Related U.S. Application Data

(60) Provisional application No. 63/402,450, filed on Aug. 30, 2022.

(51) Int. Cl.
*G06F 17/00* (2019.01)
*G06F 40/279* (2020.01)
*G06F 40/30* (2020.01)

(52) U.S. Cl.
CPC ............ *G06F 40/30* (2020.01); *G06F 40/279* (2020.01)

(58) Field of Classification Search
None
See application file for complete search history.

(56) References Cited

U.S. PATENT DOCUMENTS

| | | | |
|---|---|---|---|
| 7,930,302 B2* | 4/2011 | Bandaru | G06F 16/951 715/810 |
| 9,336,268 B1* | 5/2016 | Moudy | G06Q 50/20 |
| 9,965,462 B2* | 5/2018 | Werth | G06F 40/30 |
| 10,546,235 B2* | 1/2020 | Moudy | G06N 3/044 |
| 2014/0358523 A1* | 12/2014 | Sheth | G06F 40/284 704/9 |
| 2016/0055238 A1 | 2/2016 | Miyabe et al. | |
| 2017/0200207 A1* | 7/2017 | Aswani | G06Q 30/0282 |
| 2019/0057426 A1* | 2/2019 | Aswani | G06Q 30/0282 |
| 2021/0357591 A1* | 11/2021 | Campos Ortega | G06F 40/103 |
| 2022/0114624 A1* | 4/2022 | Jain | G06F 40/279 |

FOREIGN PATENT DOCUMENTS

| | | |
|---|---|---|
| JP | 2012256283 A | 12/2012 |
| JP | 2017-134787 A | 8/2017 |
| WO | 2014141452 A1 | 9/2014 |

OTHER PUBLICATIONS

Office Action of Jul. 16, 2024, for corresponding JP Patent Application No. 2023-140135 with English translation, pp. 1-8.

* cited by examiner

*Primary Examiner* — Satwant K Singh
(74) *Attorney, Agent, or Firm* — HEA Law PLLC

(57) ABSTRACT

Provided is a sentiment analysis system including at least one processor configured to: acquire a first comment which relates to a service, and which is input by a user who uses the service; execute clustering relating to the first comment; acquire a sentiment word relating to a sentiment about the service based on an execution result of the clustering; and analyze the sentiment in a first sentence included in the first comment based on the sentiment word.

19 Claims, 11 Drawing Sheets

I went to XYZ mobile shop.
The network connection becomes very good.

(aspect term, opinion word, polarity) =
(network connection, very good, positive)

| COMMENT ID | COMMENT | SENTENCE ID | SENTENCE | ANALYSIS RESULT DATA |
|---|---|---|---|---|
| C100 | I went to XYZ mobile shop. The network connection becomes very good. | S100 | I went to XYZ mobile shop. | — |
| | | S101 | The network connection becomes very good. | (network connection, very good, positive) |
| ... | ... | ... | ... | ... |

FIG.5

| CLUSTER ID | LABEL | COMMENT ID | SENTENCE ID | CANDIDATE WORD | APPEARANCE FREQUENCY |
|---|---|---|---|---|---|
| C1 | QUALITY | C100<br>C101<br>.<br>.<br>. | S101<br>S102<br>.<br>.<br>. | network connection<br>service<br>.<br>.<br>. | 120<br>30<br>.<br>.<br>. |
| . | . | . | . | . | . |

| CLUSTER ID | LABEL | TOPIC WORD |
|---|---|---|
| C1 | QUALITY | network connection ⋮ |
| ⋮ | ⋮ | ⋮ |

I went to XYZ mobile shop. Very good.

(aspect term, opinion word, polarity) = (network connection, very good, positive)

SENTIMENT ANALYSIS SYSTEM, SENTIMENT ANALYSIS METHOD, AND INFORMATION STORAGE MEDIUM

CROSS-REFERENCE TO RELATED APPLICATION

The present application claims priority from the U.S. provisional application No. 63/402,450, filed on Aug. 30, 2022, the disclosures of which are incorporated by reference herein.

BACKGROUND OF THE INVENTION

1. Field of the Invention

The present disclosure relates to a sentiment analysis system, a sentiment analysis method, and an information storage medium.

2. Description of the Related Art

Hitherto, there has been investigated a technology of analyzing a sentiment of a user who uses a service based on a comment which relates to the service and which is input by the user. For example, in Japanese Patent Application Laid-open No. 2017-134787, it is described that, in order to analyze evaluation about a topic in a plurality of regions, a keyword is extracted for each region from an entire posted document written in a language used in this region, and a sentiment is analyzed from the entire posted document based on this extracted keyword.

However, the technology of Japanese Patent Application Laid-open No. 2017-134787 is a technology of analyzing sentiment from the entire posted document, and hence, when an expression which does not suit the analysis of the sentiment is included in the entire posted document, an accuracy of the sentiment analysis may decrease due to this expression. For example, when a sentence suitable to the analysis of the sentiment and a sentence unsuitable to the analysis of the sentiment are included in a certain posted document, and the entire posited document is set as a target of the analysis, the sentence unsuitable to the analysis may form noise, and the accuracy may consequently decrease.

SUMMARY OF THE INVENTION

One object of the present disclosure is to increase an accuracy of sentiment analysis.

According to at least one embodiment of the present disclosure, there is provided a sentiment analysis system including at least one processor configured to: acquire a first comment which relates to a service, and which is input by a user who uses the service; execute clustering relating to the first comment; acquire a sentiment word relating to a sentiment about the service based on an execution result of the clustering; and analyze the sentiment in a first sentence included in the first comment based on the sentiment word.

BRIEF DESCRIPTION OF THE DRAWINGS

FIG. 4 is a table for showing an example of a comment database.

FIG. 5 is a table for showing an example of a cluster database.

FIG. 6 is a table for showing an example of a dictionary database.

DETAILED DESCRIPTION OF THE INVENTION

1. Overall Configuration of Sentiment Analysis System

Figure 1:
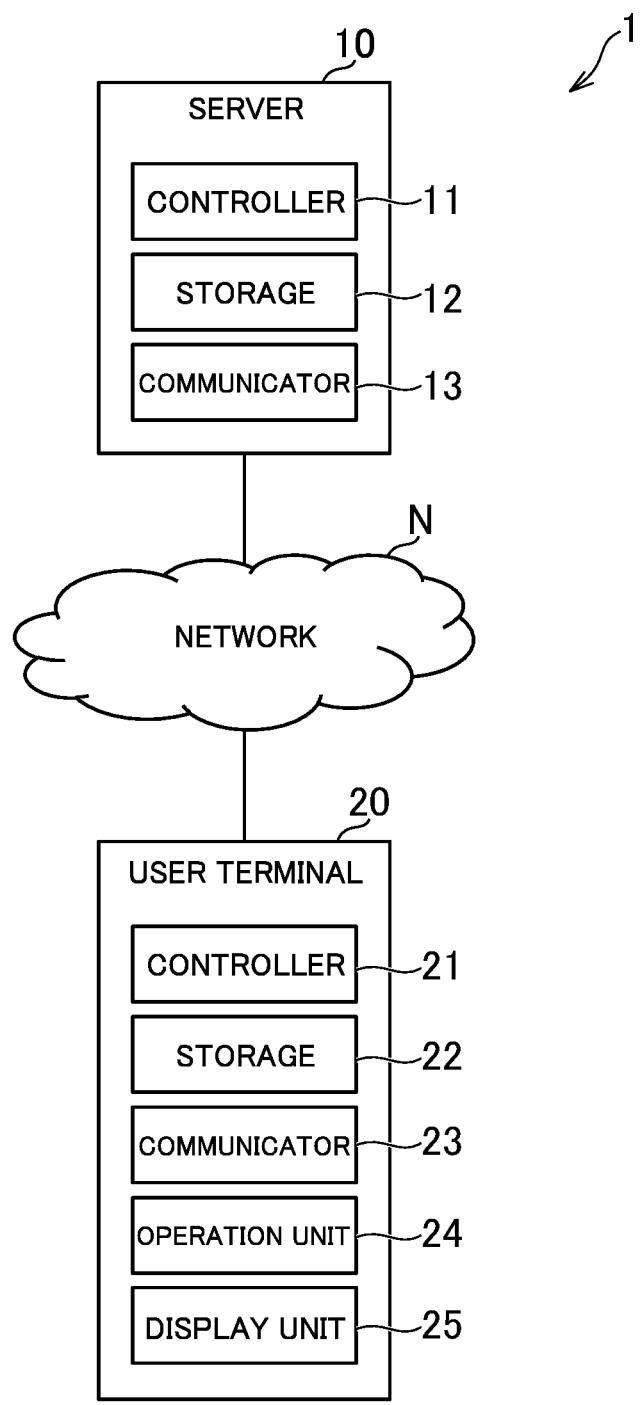
FIG. 1 is a diagram for illustrating an example of an overall configuration of a sentiment analysis system.

An example of a sentiment analysis system according to at least one embodiment of the present disclosure is described. FIG. 1 is a diagram for illustrating an example of an overall configuration of the sentiment analysis system. For example, a sentiment analysis system 1 includes a server 10 and a user terminal 20. The server 10 and the user terminal 20 are each connectable to a network N, such as the Internet or a LAN. The "sentiment" as used herein includes any one of reputation, evaluation, or feeling of a user about content of a topic word described later.

The server 10 is a server computer. A controller 11 includes at least one processor. A storage 12 includes a volatile memory such as a RAM, and a nonvolatile memory such as a flash memory. A communicator 13 includes at least one of a communication interface for wired communication or a communication interface for wireless communication.

The user terminal 20 is a computer of a user. For example, the user terminal 20 is a personal computer, a tablet terminal, a smartphone, or a wearable terminal. The physical configurations of a controller 21, a storage 22, and a communicator 23 are the same as those of the controller 11, the storage 12, and the communicator 13, respectively. An operation unit 24 is an input device such as a touch panel or a mouse. A display unit 25 is a liquid crystal display or an organic EL display.

The programs stored in the storages 12 and 22 may be supplied via the network N. Further, each computer may include at least one of a reading unit (for example, a memory card slot) for reading a computer-readable information storage medium or an input/output unit (for example, a USB port) for inputting/outputting data to and from external devices. For example, a program stored in an information storage medium may be supplied via at least one of the reading unit or the input/output unit.

Moreover, it is only required for the sentiment analysis system 1 to include at least one computer, and is not limited to the example of FIG. 1. For example, the sentiment analysis system 1 may not include the user terminal 20, and may include only the server 10. In this case, the user terminal 20 exists outside the sentiment analysis system 1. For example, the sentiment analysis system 1 may include another computer other than the server 10, and processing relating the sentiment analysis may be executed by this another computer. For example, the another computer is a personal computer, a tablet terminal, or a smartphone.

2. Overview of Sentiment Analysis System

The sentiment analysis system 1 analyzes, based on a comment input by the user who uses the service, sentiment of the user about the service. In the at least one embodiment, a communication service is described as an example of the service. The service itself may be of any type, and is not limited to the communication service. For example, the sentiment analysis system 1 may be applied to an electric commerce service, an online flea market service, a travel reservation service, a settlement service, a financial service, or another service. Moreover, the sentiment analysis system 1 may be applied to a comment about not only the service but also an item or person (target). In this case, the sentiment analysis system 1 analyzes, based on a comment input by a user, a sentiment of the user about the target.

The comment is a string indicating content relating to the service. For example, the comment is also sometimes referred to as "voice of customer." The comment includes at least one sentence. In the at least one embodiment, description is given of a case in which the user can input any string as the comment, but a format of the comment may be defined to some extent. For example, a semi-structured text may be used to input the comment. In the comment, a certain sentiment of the user may appear. The sentiment of the user does not always appear in all of sentences in the comment. For example, not the sentiment of the user, but only a fact may appear in a part of the sentences.

The sentiment is impression about the service. The sentiment may also be considered as praise or complaint about the service. In the at least one embodiment, aspect-based sentiment analysis (ABSA) is described as an example of a sentiment analysis method. The ABSA is a method involving extracting a predetermined keyword as an aspect, and predicting polarity about this keyword. The polarity is information indicating being positive or negative. The sentiment analysis method itself may be any method, and is not limited to the ABSA. For example, a method of predicting the polarity based on another keyword different from the aspect or a method of extracting only the aspect or another keyword without predicting the polarity may be used.

Figure 2:
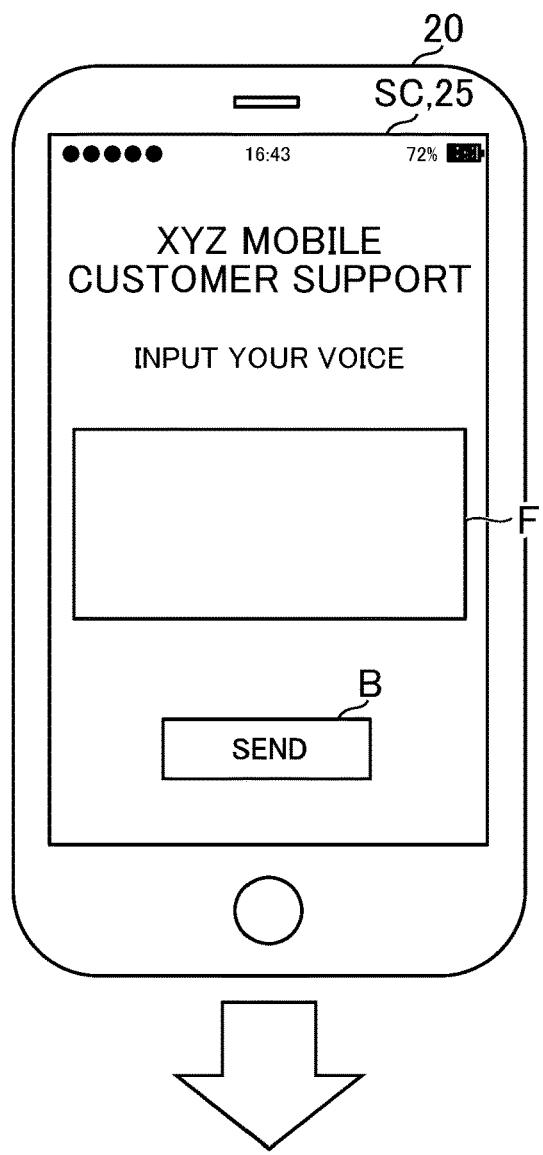
FIG. 2 is a diagram for illustrating an example of a rough flow of the sentiment analysis system.

FIG. 2 is a diagram for illustrating an example of a rough flow of the sentiment analysis system 1. For example, when the user operates the user terminal 20 to access the server 10, an input screen SC including an input form F for inputting the comment about the service and a button B is displayed on the display unit 25. The input screen SC may be in any form, and is not limited to the form of FIG. 2. For example, the input screen SC may be in such a questionnaire form that the user answers a question about the service.

For example, the user operates the operation unit 24 to input any comment in the input form F. In the example of FIG. 2, the comment is input in English, but the comment may be input in any language such as Japanese, Chinese, French, or Spanish. As the processing described in the at least one embodiment as well, processing corresponding to the language of the comment is only required to be executed. When the user selects the button B, the user terminal 20 transmits the comment input to the input form F to the server 10.

In the example of FIG. 2, the comment "I went to XYZ mobile shop. The network connection becomes very good." is input. This comment includes two sentences of "I went to XYZ mobile shop." and "The network connection becomes very good." The former sentence "I went to XYZ mobile shop." indicates only a fact that the user went to a shop, and hence the sentiment of the user does not appear. The latter sentence indicates quality of a service felt by the user, and hence the sentiment of the user appears.

For example, when the human sees the comment of FIG. 2, the human can understand that the sentiment of the user does not appear in the former sentence, and the sentiment of the user appears in the latter sentence. Further, when the human sees the latter sentence, the human can understand that such "positive" sentiment of the user that the "network connection," which is one piece of quality of the service, is "very good" appears. In the at least one embodiment, the server 10 can analyze the comment to identify that the above-mentioned sentiment appears in the latter sentence.

For example, the server 10 acquires three elements of (aspect term, opinion word, polarity) from the sentence in which the sentiment of the user appears. A method of acquiring those three elements is sometimes referred to as "aspect sentiment triplet extraction (ASTE)." The ASTE is one method of the ABSA. The aspect term indicates an aspect in the ABSA. The opinion word indicates content of the sentiment in the aspect indicated by the aspect term. The polarity indicates whether being positive or being negative. The three elements are hereinafter referred to as "analysis result data."

For example, it is assumed that the technology of Japanese Patent Application Laid-open No. 2017-134787 is applied to the ASTE. As described above, the technology of Japanese Patent Application Laid-open No. 2017-134787 sets the entire posted document as the target of the sentiment analysis. Thus, when a sentence inappropriate for the sentiment analysis is included in the posted document, this sentence may form noise, and the accuracy of the sentiment analysis may consequently decrease. Accordingly, in the at least one embodiment, the accuracy of the sentiment analysis is increased by setting, not the entire comment, but sentences included in the comment as the target of the sentiment analysis. Details of the at least one embodiment are now described.

3. Functions Implemented by Sentiment Analysis System

Figure 3:
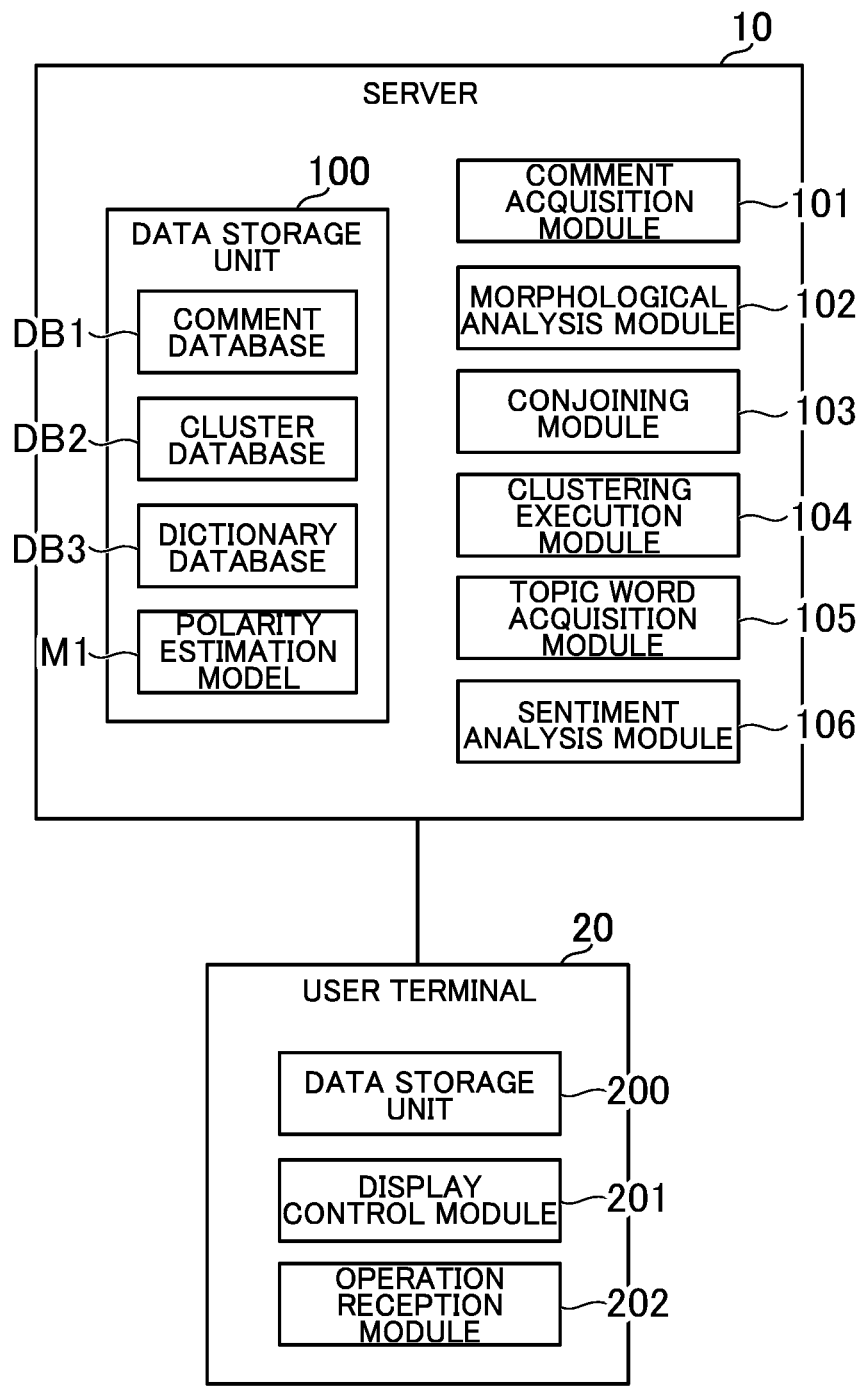
FIG. 3 is a diagram for illustrating an example of functions implemented in the sentiment analysis system.

FIG. 3 is a diagram for illustrating an example of functions implemented in the sentiment analysis system 1.
[3-1. Functions Implemented in Server]
The server 10 includes a data storage unit 100, a comment acquisition module 101, a morphological analysis module 102, a conjoining module 103, a clustering execution module 104, a topic word acquisition module 105, and a sentiment analysis module 106. The data storage unit 100 is implemented by the storage 12. The comment acquisition module 101, the morphological analysis module 102, the conjoining module 103, the clustering execution module 104, the topic word acquisition module 105, and the sentiment analysis module 106 are implemented by the controller 11.
[Data Storage Unit]
The data storage unit 100 stores data required for the sentiment analysis. For example, the data storage unit 100 stores a comment database DB1, a cluster database DB2, and a dictionary database DB3.

FIG. 4 is a table for showing an example of the comment database DB1. The comment database DB1 is a database in which various types of data on comments are stored. For example, in the comment database DB1, comment IDs, comments, sentence IDs, sentences, and analysis result data are stored. The comment ID is data that can uniquely identify a comment. The comment may be stored in the comment database DB1 in any data form, and the data form may be, for example, the text form, the rich text form, the document form, or the electronic mail form.

The sentence ID is data that can uniquely identify a sentence included in the comment. It is only required that the sentence in the comment be identified by a position of a symbol such as the period. The comment may include a plurality of sentences or may include only one sentence. The analysis result data indicates an analysis result obtained by the sentiment analysis module 106. As described above, in the at least one embodiment, the analysis result data indicates the three elements of (aspect term, opinion word, polarity). The analysis result data is not associated with a sentence in which the sentiment of the user does not appear.

Other data relating to the comment may be stored in the comment database DB1. For example, a name of the user who has input the comment, an email address of the user, and date and time of the acquisition of the comment may be stored in the comment database DB1. For example, a cluster ID or a label of a cluster to which the sentence included in the comment belongs may be stored in the comment database DB1. For example, for a comment in the questionnaire form, information that can identify a question corresponding to the comment may be stored in the comment database DB1.

FIG. 5 is a table for showing an example of the cluster database DB2. The cluster database DB2 is a database in which various types of data on an execution result of clustering obtained by the clustering execution module 104 are stored. For example, in the cluster database DB2, the cluster IDs, the labels, the comment IDs, the sentence IDs, candidate words, and appearance frequencies are stored. The cluster ID is data that can uniquely identify a cluster.

In the at least one embodiment, the cluster is a set of sentences having meanings similar to one another. The cluster is also sometimes referred to as "topic" or "group." The cluster is not limited to the set of the sentences, and may be a set of comments or candidate words having meanings similar to one another. The label is a name of the cluster. It is assumed that the label is manually input in the at least one embodiment. For example, when an administrator of the sentiment analysis system 1 inputs a string indicating the label, this string is stored in the cluster database DB2 as the label.

The comment ID and the sentence ID are the comment ID of a comment including a sentence belonging to the cluster and a sentence ID of this sentence. In the at least one embodiment, a case in which the sentence is identified by a combination of the comment ID and the sentence ID is described, but when the sentence is identified only by the sentence ID, the comment ID is not required to be stored in the cluster database DB2.

The candidate word is a word being a candidate of a topic word described later. The candidate word is all of or a part of words included in the sentence. In the at least one embodiment, a morpheme or a conjoined noun acquired by morphological analysis described later corresponds to the candidate word. In a language such as English written with a space between words, the morphological analysis may not be used, and a word separated by the spaces may be acquired as the candidate word as it is. The appearance frequency is a frequency of appearance of the candidate word in the sentences belonging to the cluster. The appearance frequency is calculated by the topic word acquisition module 105 described later. The appearance frequency can also be considered as the number of times of appearance.

FIG. 6 is a table for showing an example of the dictionary database DB3. The dictionary database DB3 is a database in which various types of data on the topic words are stored. For example, in the dictionary database DB3, the cluster ID and the label of the cluster from which topic words are acquired and those topic words are stored. It is assumed that at least one topic word is acquired from one cluster in the at least one embodiment. For topic words acquired from one cluster, an upper limit number may be defined, or the upper limit number may not particularly be defined.

The topic word is a word representing a topic which means a certain topic. The topic word is an example of the sentiment word. Thus, portions described as "topic word" in the at least one embodiment can be replaced by "sentiment word." The sentiment word is a word relating to the sentiment of the user about the service. That is, the sentiment word is a word in which the sentiment of the user appears in a certain form or a word relating to this word. The sentiment word can also be considered as a word which represents the cluster. The sentiment word may include a plurality of words or may include only one word. The sentiment word may be a word not particularly relating to a concept of the topic.

In the at least one embodiment, a case in which the aspect term corresponds to the topic word is exemplified, but the topic word may be another word other than the aspect term. For example, the opinion word may correspond to the topic word. For example, a sentiment analysis method other than the ABSA is used, it is only required that a word representing certain sentiment of the user be used as the topic word. A topic word acquired by the topic word acquisition module 105 described later is stored in the dictionary database DB3.

For example, the data storage unit 100 stores a polarity estimation model M1 other than the data described above. The polarity estimation model M1 is a model for estimating the polarity. In the at least one embodiment, the polarity estimation model M1 which uses a machine learning method is exemplified, but the polarity estimation model M1 may be a model which uses a method other than the machine learning method. For example, the polarity estimation model M1 may be a model which uses a rule base.

For example, when the polarity estimation model M1 is a model which uses a rule base, a relationship between at least one of the aspect term or the opinion word and the polarity is defined in advance as a rule. It is assumed that this rule is stored as data having a table form or another form in the data storage unit 100. The polarity associated with at least one of the aspect term or the opinion word included in a certain sentence is acquired as the polarity to be included in classification result data on this sentence.

For example, when the polarity estimation model M1 is a model which uses the machine learning method, various methods can be used as the machine learning method itself. For example, the polarity estimation model M1 may use any one method of the supervised learning, the semi-supervised learning, and the unsupervised learning. In the at least one embodiment, the polarity estimation model M1 which uses a method called "bidirectional encoder representations from transformers (BERT)" is exemplified, but the polarity estimation model M1 may use another method other than the BERT such as the Transformer or the neural network. For example, the polarity estimation model M1 may use a method called "Q&A base model." For example, for a sentence having an aspect term corresponding to a subject and an opinion word corresponding to a predicate, the polarity estimation model M1 uses dependency between the subject and the predicate as a clue, to thereby estimate the polarity.

The polarity estimation model M1 in the at least one embodiment has learned training data which is a pair of an aspect term and an opening word for training and polarity for training. The polarity for training is data indicating whether a sentence including the aspect term for training and the opinion word for training is positive or negative. The polarity for training is a polarity forming a correct answer corresponding to the aspect term for training and the opinion word for training. The training data may manually be created or may automatically be created through use of a publicly-known tool. For example, parameters of the polarity estimation model M1 are adjusted such that the polarity for training is output when the aspect term for training and the opinion word for training are input. As the learning method itself of the polarity estimation model M1, various methods used in the machine learning method can be used. The polarity estimation model M1 has learned both training data indicating a positive sentiment and training data indicating a negative sentiment.

The data storage unit 100 can store any data. The data stored in the data storage unit 100 is not limited to the above-mentioned example. For example, the data storage unit 100 may store a morphological analysis tool used in the morphological analysis, a clustering tool used in the clustering, and a program for calculating the appearance frequency. For example, the data storage unit 100 may store a threshold value for the appearance frequency for the candidate word to be set as the topic word.

[Comment Acquisition Module]

The comment acquisition module 101 acquires the comment about the service input by the user who uses the service. The comment acquired by the comment acquisition module 101 is referred to as "first comment." The first comment is a comment being a target of the clustering. That is, the first comment is a comment used to acquire the topic word. In the at least one embodiment, a case in which the first comment is also the target of the sentiment analysis is described, but the first comment is not required to be the target of the sentiment analysis. That is, the first comment may be a comment used only to acquire the topic word. In this case, as in a modification example described later, a second comment is the target of the sentiment analysis.

For example, the comment acquisition module 101 acquires the first comment input in the input form F from the user terminal 20. The first comment may not be the input from the operation unit 24, but may be input through use of a voice of the user detected by a microphone of the user terminal 20. In this case, a text converted from the voice of the user corresponds to the first comment. The comment acquisition module 101 identifies a first sentence based on the position of the symbol such as the period included in the first comment. The first sentence is a sentence included in the first comment.

For example, the comment acquisition module 101 divides the first comment into at least one first sentence. The comment acquisition module 101 issues a comment ID which does not overlap those of other first comments. The comment acquisition module 101 issues a sentence ID which does not overlap those for other first sentences. The comment acquisition module 101 stores, in the comment database DB1, the comment ID, the first comment, the sentence ID, and the first sentence in association with one another.

The comment acquisition module 101 can acquire, at any timing, the first comment stored in the comment database DB1.

The comment acquisition module 101 may acquire the first comment by using other means other than the website exemplified by the input screen SC. For example, the comment acquisition module 101 may acquire the first comment by using a dedicated application installed on the user terminal 20, an electronic mail, an SNS, an SMS, or a message application. For example, the comment acquisition module 101 may use those plurality of means to acquire the first comment.

[Morphological Analysis Module]

The morphological analysis module 102 executes the morphological analysis for the first sentence. As the morphological analysis itself, various morphological analysis tools can be used. For example, for a first sentence in English, the morphological analysis module 102 may execute the morphological analysis for the first comment based on a morphological analysis tool such as Tree Tagger or NLTK. For example, for a first sentence in Japanese, the morphological analysis module 102 may execute the morphological analysis for the first sentence based on a morphological analysis tool such as MeCab or JUMAN.

For example, the morphological analysis module 102 decomposes the first sentence into a plurality of morphemes. The morphological analysis module 102 decomposes, for each first sentence, this first sentence into a plurality of morphemes, and records the plurality of morphemes in the data storage unit 100. When a plurality of first sentences are included in the first comment, the morphological analysis module 102 executes the morphological analysis for each of the plurality of first sentences, and records, in the data storage unit 100, a plurality of morphemes obtained by decomposing each of the plurality of first sentences.

In the morphological analysis, the part of speech of each morpheme can also be identified, and hence it is assumed that the morphological analysis module 102 also records the part of speech of each morpheme in the data storage unit 100. In the example of FIG. 2, when "network" included in the latter first sentence is decomposed into two nouns of "net" and "work" through the morphological analysis, the morphological analysis module 102 records, in the data storage unit 100, a fact that the part of speech of "net" is a noun and a fact that the part of speech of "work" is a noun. The morphological analysis module 102 records, in the data storage unit 100, the parts of speech similarly for other morphemes.

[Conjoining Module]

The conjoining module 103 conjoins a plurality of nouns continuous to each other to acquire a conjoined noun when the plurality of nouns are included in a plurality of morphemes acquired from the first sentence. In the example of FIG. 2, when "network" included in the first sentence is decomposed into the two nouns of "net" and "work," the conjoining module 103 conjoins those continuous two nouns to acquire a conjoined noun of "network." The conjoining module 103 is only required to conjoin, similarly when three or more nouns are continuous to each other, the continuous three or more nouns to acquire a conjoined noun.

[Clustering Execution Module]

The clustering execution module 104 executes clustering relating to the first comment. In the at least one embodiment, the k-means clustering is exemplified as the clustering method, but, various methods can be used as the clustering method itself. For example, a clustering method such as the Ward method, the group average method, the shortest distance method, or the DBSCAN can be used. For example, the clustering execution module 104 may use a clustering method called "topic model," which is a type of the probability model, to execute the clustering. As the clustering, a method of the unsupervised learning may be used.

In the at least one embodiment, the clustering execution module 104 executes the clustering relating to the first sentence based on a feature relating to the first sentence included in the first comment. The feature relating to the first sentence is data indicating a feature of all or a part of the first sentence. The feature is also referred to as "embedded representation." For example, the clustering execution module 104 acquires a feature vector of the first sentence included in the first comment. The feature relating to the first sentence can be expressed in any form, and is not limited to the vector form. For example, the feature relating to the first sentence may be expressed in another form such as an array or a single numerical value.

In the at least one embodiment, the fastText is exemplified as an acquisition method for the feature vector of the first sentence, but various methods can be used as the acquisition method itself for the feature vector. For example, a method called BOW or Word2vec may be used to acquire the feature vector of the first sentence. For example, the clustering execution module 104 acquires a plurality of first sentences from a plurality of first comments, and acquires a feature vector of each of the plurality of first sentences.

For example, the clustering execution module 104 executes the k-means clustering based on the feature vector of each of the plurality of first sentences. The clustering execution module 104 executes the clustering so that sentences similar to one another in feature vector belong to the same cluster. The state in which the feature vectors are similar to each other corresponds to a state in which a distance between those feature vectors is short in a vector space. For example, the clustering execution module 104 executes the clustering such that a predetermined number of first sentences are identified in an ascending order of the mutual distance, and those predetermined number of first sentences are included in the same cluster. The clustering execution module 104 generates a cluster ID for each cluster, and updates the cluster database DB2 such that sentences belonging to this cluster are associated with one another.

Figure 7:
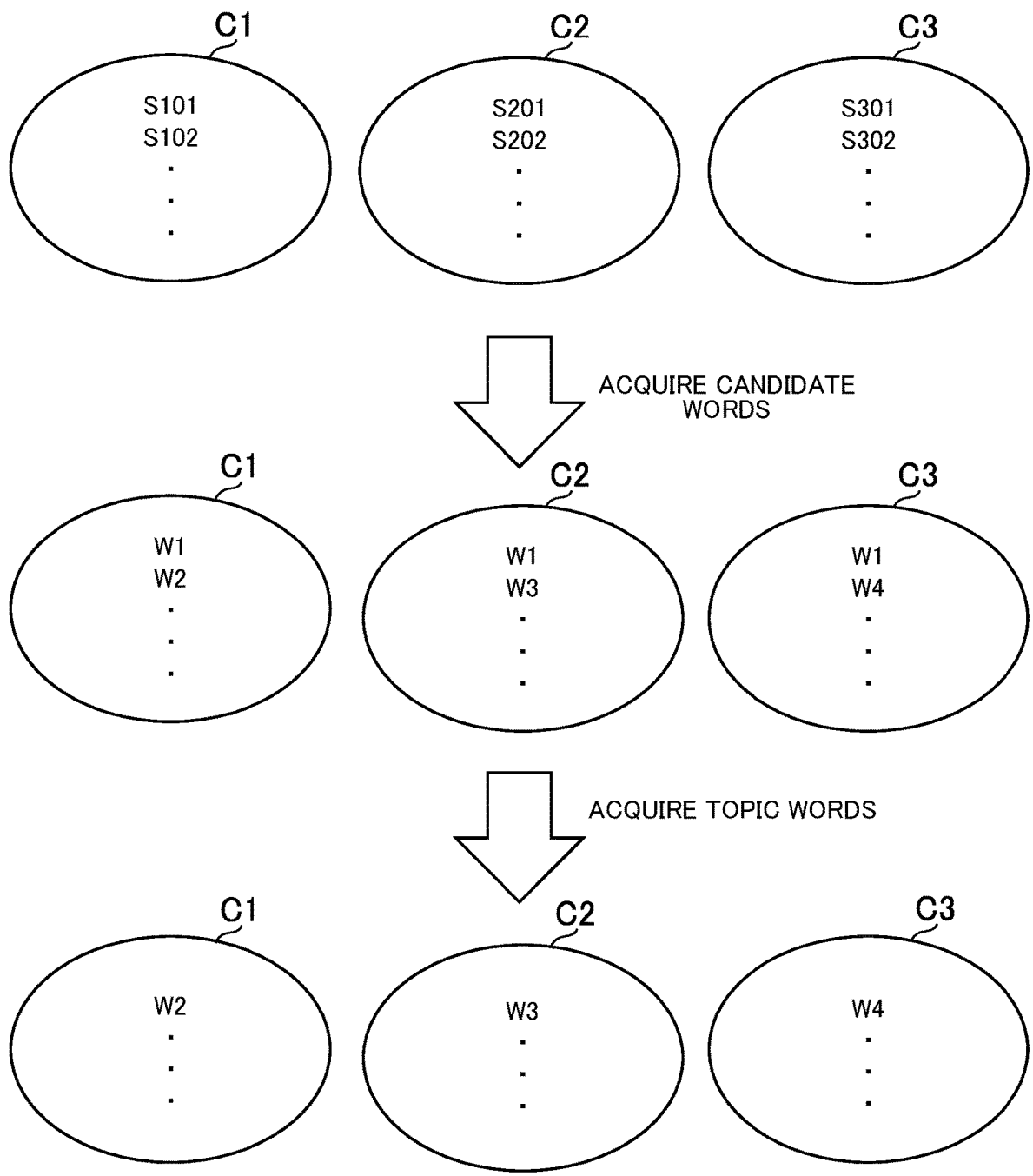
FIG. 7 is a diagram for illustrating an example of clusters.

FIG. 7 is a diagram for illustrating an example of clusters. In the example of FIG. 7, three clusters of clusters C1 to C3 are illustrated. When the clusters C1 to C3 are not distinguished from one another, the clusters C1 to C3 are hereinafter simply referred to as "clusters C." The number of clusters C may be two or four or more, and is not limited to three. For example, an upper limit number of clusters C may be determined, or the upper limit number may not particularly be determined. In the at least one embodiment, a case in which the clustering of the first sentences included in the first comment is executed is described, but the target of the clustering may not be the first sentences, but may be the entire first comment or may be individual words (morphemes or conjoined nouns) included in the first comment.

For example, first sentences S101, S102, and the like belong to the cluster C1. The clustering execution module 104 acquires candidate words W1, W2, and the like included in each of the first sentences S101, S102, and the like. In the at least one embodiment, the aspect term being a noun is acquired as the topic word, and hence the clustering execution module 104 acquires morphemes classified into the noun by the morphological analysis as the candidate words W1, W2, and the like. The candidate words W1, W2, and the like are acquired such that the candidate words do not overlap. An appearance frequency of each of the candidate words W1, W2, and the like is calculated by the topic word acquisition module 105 described later, resulting in acquisition of the topic word W2 and the like.

For example, sentences S201, S202, and the like belong to the cluster C2. The clustering execution module 104 acquires candidate words W1, W3, and the like included in each of the sentences S201, S202, and the like. The clustering execution module 104 acquires morphemes classified into the noun by the morphological analysis as the candidate words W1, W3, and the like. The candidate words W1, W3, and the like are acquired such that the candidate words do not overlap. An appearance frequency of each of the words W1, W3, and the like is calculated by the topic word acquisition module 105 described later, resulting in acquisition of the topic word W3 and the like.

For example, sentences S301, S302, and the like belong to the cluster C3. The clustering execution module 104 acquires candidate words W1, W4, and the like included in each of the sentences S301, S302, and the like. The clustering execution module 104 acquires morphemes classified into the noun by the morphological analysis as the candidate words W1, W4, and the like. The candidate words W1, W4, and the like are acquired such that the candidate words do not overlap. An appearance frequency of each of the words W1, W4, and the like is calculated by the topic word acquisition module 105 described later, resulting in acquisition of the topic word W4 and the like.

When the opinion word being an adjective is to be acquired as the topic word, the clustering execution module 104 is only required to acquire, as the candidate words, morphemes classified into the adjective through the morphological analysis. Moreover, the aspect term may be a part of speech other than the noun, and the opinion word may be a part of speech other than the adjective. The clustering execution module 104 is only required to acquire, as the candidate word, a morpheme of a part of speech set as the candidate word. The clustering execution module 104 may acquire, as the candidate words, all words independently of a particular part of speech.

In the at least one embodiment, when a plurality of nouns decomposed by the morphological analysis are continuous to each other, those nouns are conjoined to each other into a conjoined noun. Thus, the clustering execution module 104 executes the clustering based on the conjoined noun. For example, the clustering execution module 104 acquires the feature vectors of the first sentences based on the conjoined nouns, to thereby execute the clustering. The clustering execution module 104 acquires the feature vectors of the first sentences based on not the plurality of nouns before the conjoining, but the conjoined nouns. The execution method for the clustering is as described above.

[Topic Word Acquisition Module]

The topic word acquisition module 105 acquires the topic words based on the execution result of the clustering. For example, the topic word acquisition module 105 acquires, for each cluster C, words included in the first sentences belonging to this cluster as topic words. For example, the topic word acquisition module 105 acquires, for each cluster C to which the first sentences belong, topic words representing this cluster C.

In the at least one embodiment, the topic word acquisition module 105 acquires a plurality of candidate words relating to the topic words for each cluster C based on the execution result of the clustering, and acquires the topic words from the plurality of candidate words. For example, the topic word acquisition module 105 calculates, for each candidate word, an appearance frequency relating to this candidate word, and acquires the topic words based on this appearance frequency.

For example, the topic word acquisition module 105 counts the appearance of each candidate word for each cluster C, to thereby acquire the count as the appearance frequency. The calculation method itself for the appearance frequency may be any method, and may be, for example, a method of simply counting the number of times of appearance. As another example, the TF-IDF method may be used. When the TF-IDF method is used, the appearance frequency of a candidate word frequently appearing in only a certain specific cluster C is high, and the appearance frequency of a candidate word which uniformly appears in any clusters C is low.

In the example of FIG. 7, the topic word acquisition module 105 calculates the appearance frequency of each of the candidate words W1, W2, and the like in the cluster C1, and stores the cluster ID, each of the candidate words, and the appearance frequency in association with one another in the cluster database DB2. The topic word acquisition module 105 calculates the appearance frequency of each of the candidate words W1, W3, and the like in the cluster C2, and stores the cluster ID, each of the candidate words, and the appearance frequency in association with one another in the cluster database DB2. The topic word acquisition module 105 calculates the appearance frequency of each of the candidate words W1, W4, and the like in the cluster C3, and stores the cluster ID, each of the candidate words, and the appearance frequency in association with one another in the cluster database DB2.

For example, the topic word acquisition module 105 may acquire, as the topic word, a candidate word having an appearance frequency equal to or higher than a threshold value. The threshold value may be common to all of the clusters C, or the threshold value may be determined for each cluster C. For example, the threshold value may correspond to the number of candidate words belonging to the cluster C. The topic word acquisition module 105 may acquire, as the topic words, a predetermined number of candidate words in the descending order of the appearance frequency.

In the example of FIG. 7, the topic word acquisition module 105 calculates the appearance frequency based on the TF-IDF method. The candidate word W1 uniformly appears in the clusters C1 to C3, and hence the appearance frequency based on the TF-IDF method is low. The candidate word W1 is not a word which represents each of the clusters C1 to C3 but merely a word generally used when a certain comment about the service is input, and hence is not acquired as the topic word.

Meanwhile, the candidate word W2 appears only in the cluster C1, and hence the appearance frequency based on the TF-IDF method is high. The candidate word W2 is a representative word well representing the feature of the cluster C1, and hence is acquired as the topic word of the cluster C1. Similarly, the candidate word W3 is a representative word of the cluster C2, and hence is acquired as the topic word of the cluster C2. The candidate word W4 is a representative word of the cluster C3, and hence is acquired as the topic word of the cluster C3.

The topic word acquisition module 105 is only required to acquire the topic words based on a method determined in advance. The acquisition method for the topic words is not limited to the above-mentioned example. For example, the topic word acquisition module 105 may acquire, as the topic words, all candidate words without calculating the appearance frequencies. For example, the topic word acquisition module 105 may acquire, as the topic words, candidate words randomly selected from a plurality of candidate words.

[Sentiment Analysis Module]

The sentiment analysis module 106 analyzes, based on the topic words, the sentiment in the first sentence included in the first comment. In the at least one embodiment, a case in which the sentiment analysis module 106 analyzes the sentiment in the first sentence based on the topic word is described. The sentiment analysis module 106 may analyze, based on the topic words, the sentiment in a second sentence included in the second comment. The case in which the sentiment in the second sentence is analyzed is described in the modification example described later.

The second comment is a comment different from the first comment. The second comment is a comment not being a target of the clustering. That is, the second comment is a comment not used to acquire the topic word. The comment acquisition module 101 described above may acquire the second comment. An acquisition method for the second comment may be the same as the acquisition method for the first comment. In the at least one embodiment described below, it is assumed that the first sentence included in the first comment is the target of the sentiment analysis.

In the at least one embodiment, the sentiment analysis module 106 analyzes the sentiment by determining whether or not the topic word is included in the first sentence. The sentiment is expressed by a plurality of elements including the topic word and other elements relating to the topic word, and hence, when it is determined that the topic word is included in the first sentence, the sentiment analysis module 106 acquires another element based on another portion which is included in the first sentence and is other than a portion of the topic word, to thereby analyze the sentiment.

For example, the sentiment analysis module 106 acquires, as the another element, a dependency word having a dependency relationship with the topic word included in the first sentence from the another portion. As an acquisition method for the dependency word itself, various dependency analysis tools can be used. For example, a tool which can execute dependency analysis exists in the morphological analysis tools described above, and hence the sentiment analysis module 106 may use the morphological analysis tool to acquire the dependency word. For example, when the aspect term being the noun corresponds to the topic word as in the at least one embodiment, the sentiment analysis module 106 may identify, as the dependency word, an adjective having the dependency relationship with the noun.

In the example of FIG. 2, the sentiment analysis module 106 identifies, as the dependency word, "very good" having the dependency relationship with the aspect term "network connection" being the topic word. The sentiment analysis module 106 acquires this identified dependency word "very good" as the opinion word. In this case, a portion "The becomes very good." of the first sentence other than the aspect term corresponds to the another portion, and the opinion word corresponds to the another element.

The topic word may be an opinion word. In the example of FIG. 2, the sentiment analysis module 106 identifies, as the dependency word, "network connection" having the dependency relationship with the opinion word "very good" being the topic word. The sentiment analysis module 106 acquires this identified dependency word "network connection" as the aspect term. In this case, the aspect term corresponds to the another element. When the opinion word being an adjective corresponds to the topic word, the sentiment analysis module 106 may identify, as the dependency word, a noun (subject) having the dependency relationship with the adjective.

In the at least one embodiment, a plurality of elements which express the sentiment include the topic word, the dependency word, and the polarity relating to the sentiment. The polarity is the information indicating whether the sentiment is positive or negative. In the at least one embodiment, a case in which the polarity is expressed in binary values being positive and negative, but an intermediate value other than those binary values may exist. For example, the polarity may be information expressing, in percentage, a degree as to what degree the polarity is positive or to what degree the polarity is negative.

For example, the sentiment analysis module 106 analyzes the sentiment by acquiring the polarity based on at least one of the topic word or the dependency word. In the at least one embodiment, a case in which the sentiment analysis module 106 acquires the polarity based on both of the topic word and the dependency word, but the sentiment analysis module 106 may acquire the polarity based on only any one of the topic word or the dependency word.

For example, the sentiment analysis module 106 acquires the polarity based on the topic word, the dependency word, and the polarity estimation model M1. The sentiment analysis module 106 inputs the topic word and the dependency word into the polarity estimation model M1. The polarity estimation model M1 calculates a feature vector of the topic word and the dependency word, and outputs the polarity corresponding to the feature vector. The sentiment analysis module 106 acquires the polarity output from the polarity estimation model M1.

For example, the sentiment analysis module 106 generates the analysis result data based on an execution result of the above-mentioned sentiment analysis, and stores the analysis result data in the comment database DB1. The analysis result data may be used for any purpose. For example, the server 10 may transmit the analysis result data to a terminal of the administrator of the sentiment analysis system 1. Sentiments of various users may be displayed in association with the label of the cluster C based on the analysis result data on the terminal of the administrator.

[3-2. Functions Implemented in User Terminal]

The user terminal 20 includes a data storage unit 200, a display control module 201, and an operation reception module 202. The data storage unit 200 is implemented by the storage 22. The display control module 201 and the operation reception module 202 are implemented by the controller 21.

[Data Storage Unit]

The data storage unit 200 stores data required for the input of the first comment. For example, the data storage unit 200 stores a browser required to display the input screen SC. For example, the data storage unit 200 may store not the browser, but a dedicated application. For example, when the first comment is input through use of the voice, the data storage unit 200 may store a conversion tool which converts the sound to a text.

[Display Control Module]

The display control module 201 causes the display unit 25 to display the input screen SC.

[Operation Reception Module]

The operation reception module 202 receives an operation for inputting the first comment.

4. Processing Executed in Sentiment Analysis System

Figure 8:
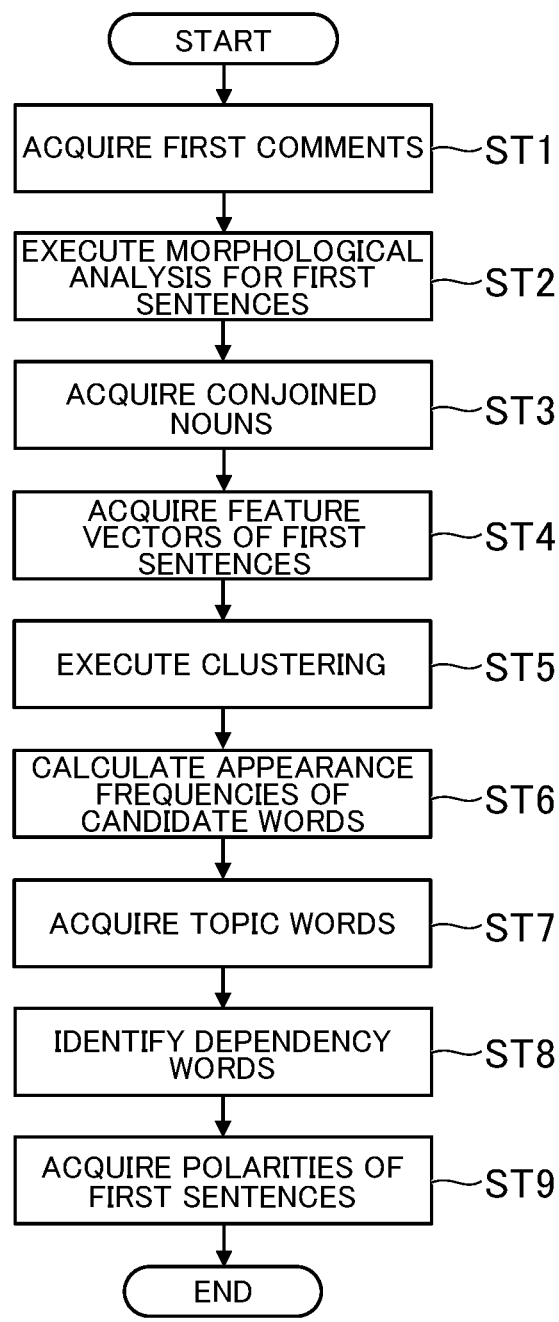
FIG. 8 is a flowchart for illustrating an example of processing executed in the sentiment analysis system.

FIG. 8 is a flowchart for illustrating an example of processing executed in the sentiment analysis system 1. In FIG. 8, the processing executed by the server 10 is illustrated. The processing of FIG. 8 is executed by the controller 11 operating in accordance with a program stored in the storage 12. It is assumed that, before the execution of the processing of FIG. 8, the server 10 has acquired the first comments from each of the plurality of user terminals 20, and has stored, in the comment database DB1, the first comment input by each of a plurality of users.

As illustrated in FIG. 8, the server 10 acquires the first comments stored in the comment database DB1 (Step ST1). A case in which the server 10 acquires a predetermined number of first comments in Step ST1 is described, but the server 10 may acquire one first comment each time, and may repeat processing steps of Step ST2 and subsequent steps. The server 10 decomposes each of the first comments into first sentences, and executes the morphological analysis for the first sentences (Step ST2). The server 10 acquires conjoined nouns by conjoining continuous nouns among a plurality of morphemes acquired from the first sentences (Step ST3). When no continuous nouns exist, the processing step of Step ST3 is not executed.

The server 10 acquires feature vectors of the first sentences (Step ST4). The server 10 executes the clustering based on the feature vectors acquired in Step ST4 (Step ST5). In Step ST5, the server 10 executes the clustering such that sentences having feature vectors similar to one another belong to the same cluster C. The server 10 calculates the appearance frequency of each candidate word for each cluster C (Step ST6). The server 10 acquires topic words based on the appearance frequencies of the candidate words for each cluster C (Step ST7). In Step ST7, the server 10 acquires, as the topic words, the candidate words each having an appearance frequency equal to or higher than the threshold value. The creation of the dictionary database DB3 is completed by the processing steps up to Step ST7.

The server 10 identifies a dependency word having the dependency relationship with the topic word for each first comment (Step ST8). In Step ST8, the server 10 identifies, as the opinion words, the dependency words having the dependency relationship with the topic words being the aspect terms. The server 10 acquires, for each first sentence, the polarity of this first sentence based on the topic word and the dependency word acquired from this first sentence and the polarity estimation model M1 (Step ST9), and this processing is finished.

The sentiment analysis system 1 according to the at least one embodiment acquires the topic words relating to the sentiment about the service based on the execution result of the clustering relating to the first comment which is input by the user using the service and relates to the service. The sentiment analysis system 1 analyzes the sentiment in the first sentences included in the first comment based on the topic words. As a result, even when a first sentence inappropriate for the sentiment analysis is included in the first comment, it is possible to prevent this first sentence from forming the noise by not setting the entire first comment as the target of the sentiment analysis, but setting the first sentences as the target of the sentiment analysis, and hence the accuracy of the sentiment analysis increases.

Moreover, the sentiment analysis system 1 analyzes the sentiment in the first sentence based on the topic word. The sentiment analysis system 1 may set the second sentence as the target of the sentiment analysis as in the modification example described later. However, the sentiment analysis system 1 can analyze the sentiment in the first sentence by setting the first sentence as the target of the sentiment analysis without creating a sentiment analysis model as in the modification example described later.

Moreover, the sentiment analysis system 1 executes the clustering relating to the first sentences based on the features relating to the first sentences included in the first comment. The sentiment analysis system 1 acquires the topic words representing the cluster C for each cluster C relating to the first sentences. The topic words more appropriate for the sentiment analysis can be acquired by setting the first sentences as the target of the clustering, and hence the accuracy of the sentiment analysis increases more.

Moreover, the sentiment analysis system 1 analyzes the sentiment by determining whether or not the topic word is included in the first sentence. As a result, the sentiment analysis for the first sentence including the topic word representing the cluster C can be executed, resulting in an increase in accuracy of the sentiment analysis.

Moreover, when it is determined that the topic word is included in the first sentence, the sentiment analysis system 1 analyzes the sentiment by acquiring the another element based on the another portion which is included in the first sentence and is other than the portion of this topic word. The accuracy of the sentiment analysis increases more by analyzing the sentiment through use of the another portion other than the portion of the topic word.

Moreover, the sentiment analysis system 1 acquires, from the another portion other than the portion of the topic word, the dependency word which is included in the first sentence and has the dependency relationship with the topic word, as the another element. The accuracy of the sentiment analysis increases more by using the dependency word having the dependency relationship with the topic word to analyze the sentiment.

Moreover, the sentiment analysis system 1 analyzes the sentiment by acquiring the polarity based on at least one of the topic word or the dependency word. As a result, the polarity of the sentiment can be estimated.

Moreover, the sentiment analysis system 1 acquires a plurality of candidate words relating to the topic words for each cluster C based on the execution result of the clustering. The sentiment analysis system 1 acquires the topic words from the plurality of candidate words. Topic words appropriate for the cluster C can be acquired by acquiring the topic words from the plurality of candidate words, and hence the accuracy of the sentiment analysis increases more.

Moreover, the sentiment analysis system 1 calculates, for each candidate word, the appearance frequency of this candidate word. The sentiment analysis system 1 acquires the topic words based on the calculated appearance frequencies. As a result, the topic words representing the cluster C can be acquired by selecting the candidate words frequently appearing in the first sentences belonging to the cluster C as the topic words, and hence the accuracy of the sentiment analysis increases more.

Moreover, the sentiment analysis system 1 conjoins, when a plurality of nouns continuous to each other are included in a plurality of morphemes acquired from the first comment, the plurality of nouns to acquire a conjoined noun. The sentiment analysis system 1 executes the clustering based on the conjoined noun. As a result, even when a word which is originally one noun is decomposed into a plurality of nouns by the morphological analysis, the plurality of nouns can be restored to the conjoined noun being originally the one word, and hence the accuracy of the sentiment analysis increases more.

5. Modification Examples

The present disclosure is not limited to the example of the at least one embodiment described above, and can be modified suitably without departing from the spirit of the present disclosure.

Figure 9:
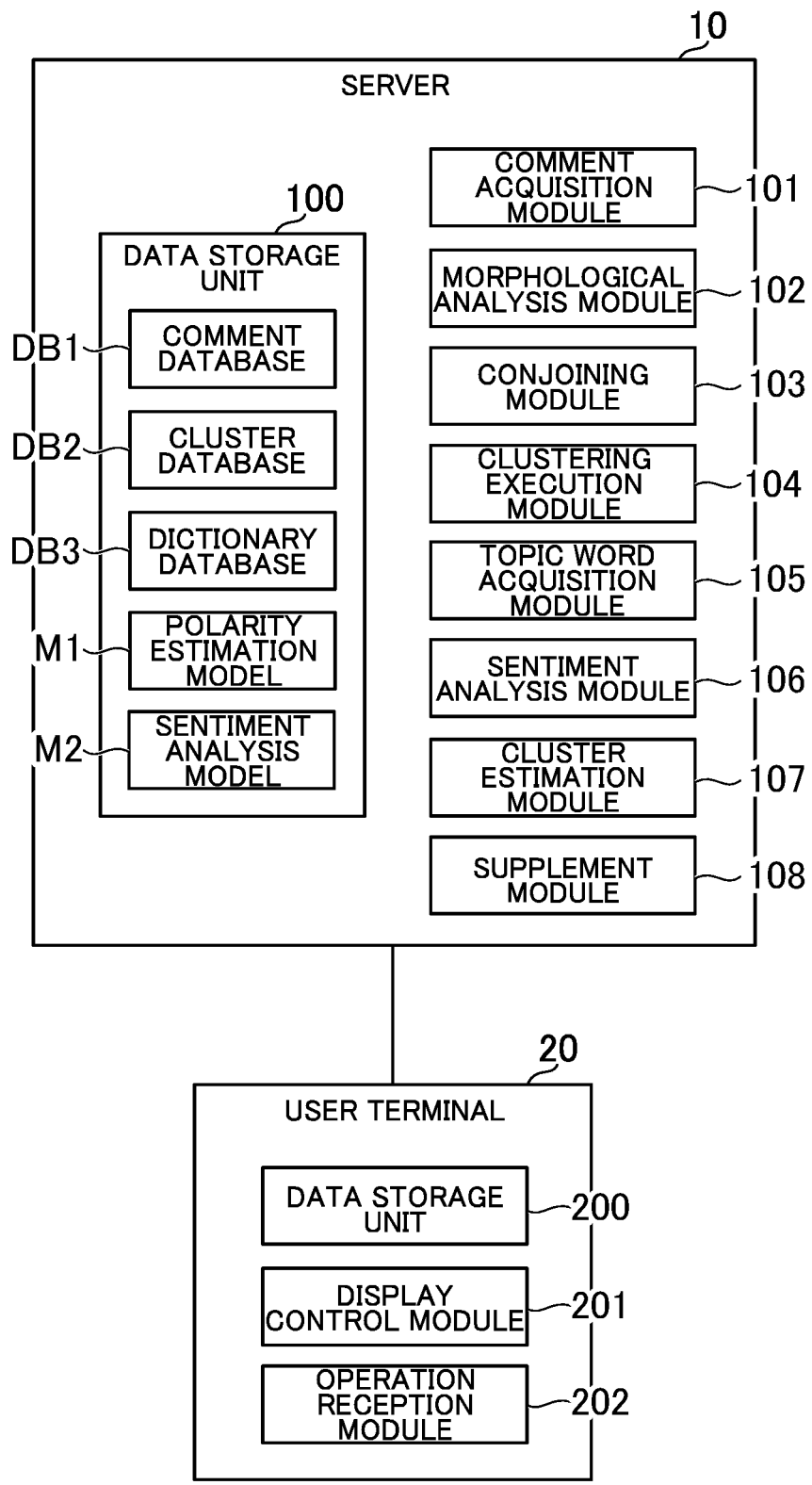
FIG. 9 is diagram for illustrating an example of functions in modification examples.

FIG. 9 is a diagram for illustrating an example of functions in the modification examples. As illustrated in FIG. 9, in the modification examples described below, a cluster estimation module 107 and a supplement module 108 are implemented. The cluster estimation module 107 and the supplement module 108 are implemented mainly by the controller 11. Moreover, the data storage unit 100 stores a sentiment analysis model M2. Details of the sentiment analysis model M2 are described later.

5-1. Modification Example 1

For example, the case in which the label of the cluster C is manually added is described in the at least one embodiment, but the label of the cluster C may automatically be added. The sentiment analysis system 1 according to Modification Example 1 further includes the cluster estimation module 107. The cluster estimation module 107 estimates, for each cluster C, based on the topic words of this cluster C and a relevant word associated with a predetermined topic, whether or not this cluster C relates to this predetermined topic. The relevant word is a word representing a predetermined topic. The relevant word is also sometimes referred to as "seed word."

Figure 10:
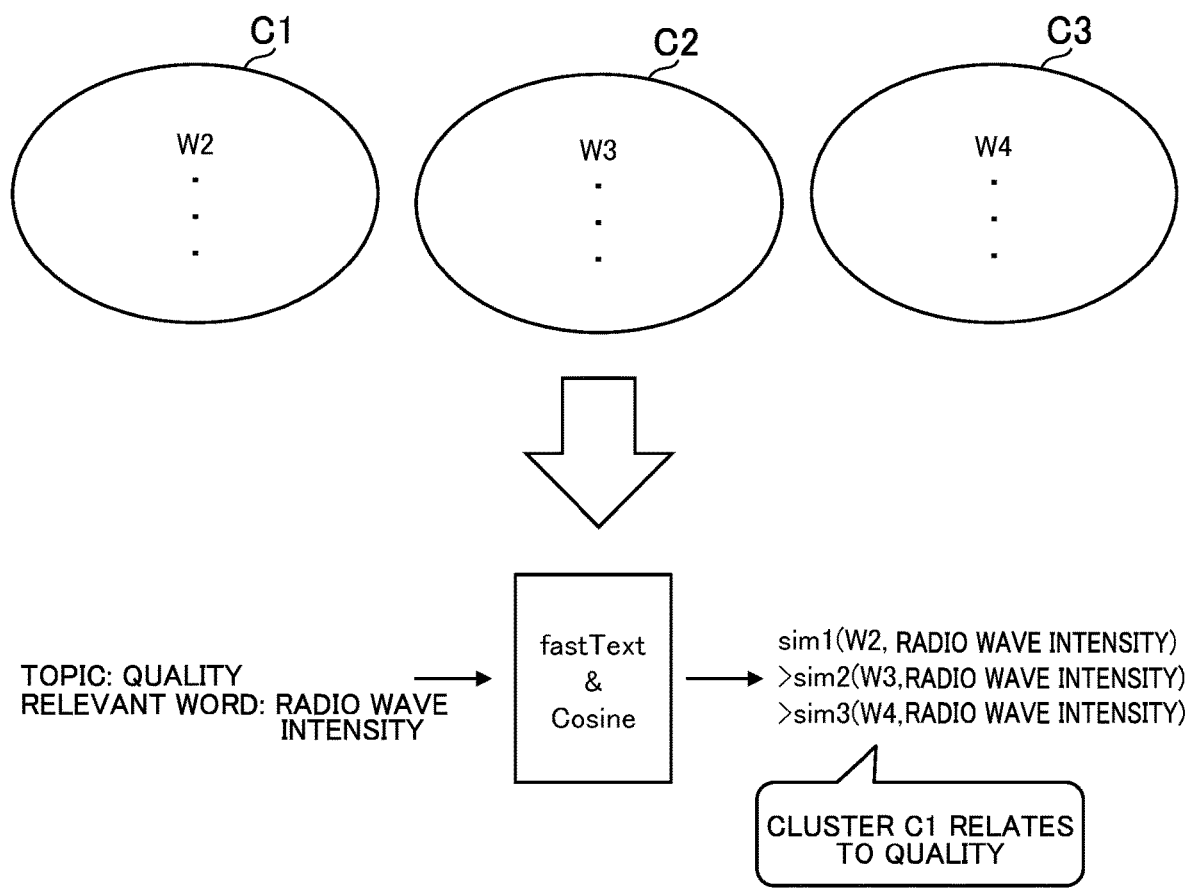
FIG. 10 is a diagram for illustrating an example of processing of adding a label to a cluster.

FIG. 10 is a diagram for illustrating an example of processing of adding a label to each cluster C. In Modification Example 1, the cluster estimation module 107 acquires a feature vector of the topic word and a feature vector of the relevant word for each cluster C. The acquisition method for the feature vectors is as described in the at least one embodiment. The feature of the relevant word may also be expressed in another form other than the vector form (for example, an array form or a single numerical value). In Modification Example 1, a case in which the fastText is used as in the at least one embodiment is described.

In the example of FIG. 10, the topic is "quality," and the relevant word is "radio wave intensity." This relevant word is a word representing one quality in the service. The cluster estimation module 107 calculates a cosine similarity sim1 between a feature vector of the topic word W2 of the cluster C1 and a feature vector of the relevant word. The cluster estimation module 107 calculates a cosine similarity sim2 between a feature vector of the topic word W3 of the cluster C2 and the feature vector of the relevant word. The cluster estimation module 107 calculates a cosine similarity sim3 between a feature vector of the topic word W4 of the cluster C3 and the feature vector of the relevant word.

For example, the cluster estimation module 107 adds, as the label, the topic associated with the relevant word to the cluster C1 associated with the highest cosine similarity sim1 among the cosine similarities sim1 to sim3. The cluster estimation module 107 may add the label based on the cosine similarities sim1 to sim3 and a threshold value. For example, when only the cosine similarity sim1 is equal to or higher than the threshold value among the cosine similarities sim1 to sim3, the cluster estimation module 107 adds, as the label, the topic associated with the relevant word to the cluster C1 associated with the cosine similarity sim1 equal to or higher than the threshold value.

The sentiment analysis module 106 in Modification Example 1 analyzes the sentiment based on the estimation result of the cluster estimation module 107. The analysis result data in Modification Example 1 also includes the label of the cluster C to which the topic word belongs in addition to the three elements described in the at least one embodiment. The sentiment analysis module 106 analyzes the sentiment by acquiring the analysis result data also including the label of the cluster C.

The sentiment analysis system 1 according to Modification Example 1 estimates, for each cluster C, based on the topic word W of this cluster C and the relevant word associated with the predetermined topic, whether or not this cluster C relates to this predetermined topic. The sentiment analysis system 1 analyzes the sentiment based on this estimation result. As a result, the accuracy of the sentiment analysis increases more.

5-2. Modification Example 2

For example, when the first sentence included in the first comment input by the user is insufficient as a sentence, the three elements sometimes cannot be identified from the first sentence. For example, a first sentence from which an aspect term is acquired but in which an opinion word is omitted may exist. Conversely, a first sentence from which an opinion word is acquired but in which an aspect term is omitted may exist. In this case, an element that is not acquired among the three elements may be supplemented through a certain method.

The sentiment analysis system 1 according to Modification Example 2 includes the supplement module 108. The supplement module 108 supplements, when the another element relating to the topic word is not acquired from the another portion other than the topic word, the another element based on a predetermined supplement method. When the another element is acquired, the supplement by the supplement module 108 is not executed. In Modification Example 2, the case in which the topic word is the opinion word and the another element is the aspect term is exemplified. The supplement method may be methods described in Modification Example 3 or Modification Example 4 in addition to the method described in Modification Example 2.

Figure 11:
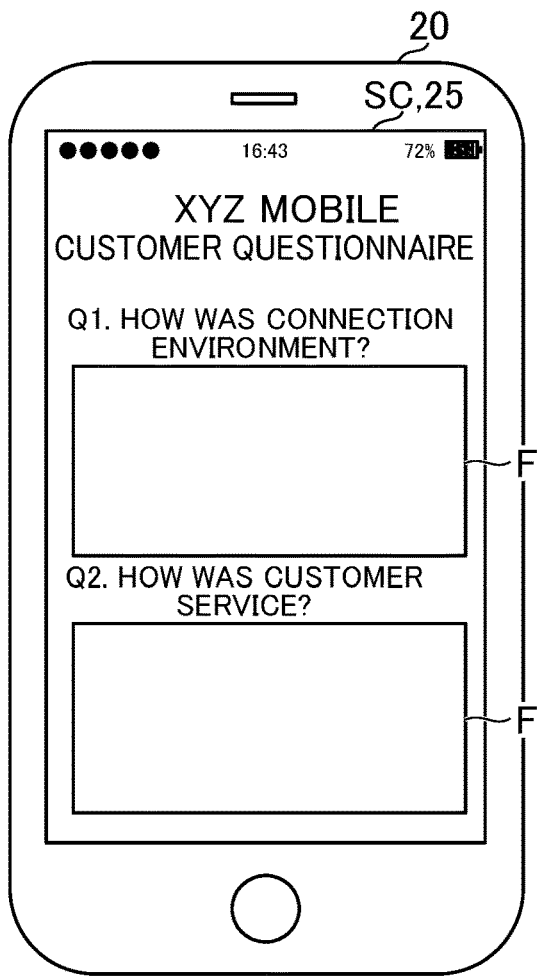
FIG. 11 is a diagram for illustrating an example of a method of supplementing an aspect term of a first sentence from which an opinion word is acquired and an aspect term is not acquired.
Figure 11:
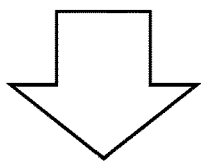
Figure 11:
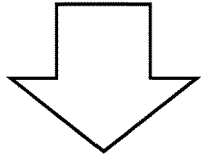

FIG. 11 is a diagram for illustrating an example of a method of supplementing the aspect term of the first sentence from which the opinion word is acquired and the aspect term is not acquired. As illustrated in FIG. 11, the input screen SC in Modification Example 2 has the questionnaire form. The first comment is an answer to a question. The supplement module 108 supplements the another element based on content of the question. For example, in the example of FIG. 11, it is assumed that, to a question "How was the connection environment?," "I went to XYZ mobile shop. Very good" is acquired as the first comment. The first comment includes two first sentences of "I went to XYZ mobile shop." and "Very good." As in the at least one embodiment, the sentiment of the user does not appear in the former first sentence.

In the example of FIG. 11, a subject is omitted in the latter first sentence. Thus, as in the at least one embodiment, the dependency of the opinion word "Very good" being the topic word does not exist, and hence the aspect term such as "network connection" cannot be identified. In this case, the supplement module 108 supplements the aspect term based on the question "How was the connection environment?" corresponding to the first sentence in which the aspect term cannot be identified. For example, the supplement module 108 may supplement the aspect term directly with "connection environment," which is the subject of this question, or may associate an aspect term such as "network connection" with this question in advance, and may supplement the aspect term with "network connection" associated with this question.

The supplement method of the supplement module 108 is not limited to the above-mentioned example. For example, it is assumed that "Network connection." is acquired as the first comment in response to a question such as "Which service you have used is good?" In this case, the first comment is formed of only one first sentence. Further, it is assumed that, "network connection" being the aspect term is acquired as a topic word. In this case, the opinion word is omitted in the first sentence of the first comment, and hence the supplement module 108 may supplement the opinion word directly with the adjective "bad" included in the above-mentioned question or may associate an opinion word such as "very good" with this question in advance, and may supplement the opinion word with "very good" associated with this question.

The sentiment analysis system 1 according to Modification Example 2 supplements the another element relating to the topic word based on the predetermined supplement method when the another element is not acquired from the another portion other than the topic word. As a result, even when the first sentence is incomplete and the another element cannot be acquired, the another element can be supplemented. As a result, the accuracy of the sentiment analysis increases. For example, even when only the aspect term can be acquired from the first sentence, the sentiment analysis for the insufficient first sentence not including the opinion word can be executed by supplementing the opinion word. Conversely, even when only the opinion word can be acquired from the first sentence, the sentiment analysis for the insufficient first sentence not including the aspect term can be executed by supplementing the aspect term.

Moreover, the sentiment analysis system 1 supplements the another element relating to the topic word based on the content of the question. As a result, an accuracy of the supplement for the another element increases when the first sentence is incomplete. For example, the user inputs an answer relating to the connection environment in response to a question such as "How was the connection environment?," and hence, even when the first sentence is an incomplete first sentence not including the aspect term, it is possible to estimate that the first sentence has content relating to the connection environment. In this case, the aspect term can be supplemented based on the question. For example, the user inputs a bad service in response to a question such as "Which service you have used is bad?," and hence, even when the first sentence is an incomplete first sentence not including the opinion word, it is possible to estimate that the first sentence is the service the user considers as a bad service. In this case, the opinion word can be supplemented based on the question.

5-3. Modification Example 3

For example, in Modification Example 2, when the first sentence is incomplete, and an aspect term and an opinion word are acquired from a third sentence having similar content, a word or a term which cannot be acquired due to the incompleteness may be supplemented with at least one of the aspect term or the opinion word acquired from the third sentence. It is assumed that the input screen SC in Modification Example 3 has the free form as that in the at least one embodiment, but may has the question form as that in Modification Example 2. In Modification Example 3, it is assumed that the topic word is the opinion word.

For example, it is assumed that the user inputs a first comment such as "I went to XYZ mobile shop. The service becomes very good." As described in the at least one embodiment, the sentiment of the user does not appear in the former first sentence. The latter first sentence includes "very good" being the opinion word as the topic word. The destination of the dependency is the subject "The service" but is an abstract word, and hence it is assumed that "The service" is inappropriate as the aspect term.

In the above-mentioned example, it is assumed that the user inputs a third comment such as "I went to XYZ mobile shop. The network connection becomes very good." A sentence included in the third comment is referred to as "third sentence." In this case, as described in the at least one embodiment, the aspect term "network connection" and the opinion word "very good" can be acquired from a latter third sentence of the third comment. As an acquisition method therefor, the first comment and the first sentence in the description of the at least one embodiment are only required to be replaced by the third comment and the third sentence, respectively.

The supplement module 108 in Modification Example 3 supplements the another element of the first sentence based on the another element acquired from the third comment including content similar to that of the first sentence. For example, in the above-mentioned example, "very good" being the opinion word is acquired as the topic word, but the aspect term is not acquired. For example, the supplement module 108 identifies, based on the feature vector of the latter first sentence of the first comment and a feature vector of the latter third sentence of the third comment, that those first sentence and third sentence are similar to each other. A state in which those sentences are similar to each other is a state in which the distance between the feature vectors is shorter than the threshold value. For example, the supplement module 108 supplements the aspect term not acquired from the first sentence with "network connection" being the aspect term acquired from the third sentence. The third sentence may be a sentence including not the aspect term but the same opinion word as that of the first sentence. In this case, the feature vector is not calculated, and a third sentence which includes the same opinion word as that of the first sentence not including an aspect term is identified.

The supplement method of the supplement module 108 is not limited to the above-mentioned example. For example, when an aspect term is acquired from the first sentence, and an opinion word is not acquired, the supplement module 108 may supplement the aspect term of the first sentence with an opinion word acquired from a third sentence having content similar to that of the first sentence. For example, it is assumed that the user inputs a first sentence from which an opinion word is omitted, such as "I went to XYZ mobile shop. The network connection becomes . . . " In this case, the supplement module 108 identifies a third sentence "The network connection becomes very good." similar to the latter first sentence. The supplement module 108 may identify "very good," which is an opinion word acquired from this third sentence, as the opinion word of the first sentence.

The sentiment analysis system 1 according to Modification Example 3 supplements the another element of the first sentence based on the another element acquired from the third sentence including content similar to that of the first sentence. As a result, an accuracy of the supplement for the another element increases when the first sentence is incomplete. For example, even when the first sentence is an incomplete first sentence not including an aspect term, it is possible to supplement the first sentence with an aspect term acquired from a third sentence including content similar to that of the first sentence. For example, even when the first sentence is an incomplete first sentence not including an opinion word, it is possible to supplement the first sentence with an opinion word acquired from a third sentence including content similar to that of the first sentence.

5-4. Modification Example 4

For example, the first comment may not be a first comment input to a dedicated form such as the input screen SC, but may be a post on an SNS. In this case, information called "hashtag" is sometimes associated with the first comment. The hashtag is information which can classify the content of the first comment. In this case, the supplement module 108 may supplement an incomplete first sentence with an element lacking from the first sentence based on the hashtag associated with this first sentence.

The hashtag is an example of a classification. Thus, a portion described as "hashtag" can be replaced by "classification." The classification is only required to be information which classifies the first comment in a certain form, and is not limited to the hashtag. For example, information using a symbol other than a hash mark may correspond to the classification. In Modification Example 4, a case in which a user who inputs the first comment inputs the classification is described, but the user may select a classification from a plurality of classifications defined in advance.

The supplement module 108 in Modification Example 4 supplements the another element based on the hashtag. For example, it is assumed that the user inputs, as a post on the SNS, a first comment such as "I went to XYZ mobile shop. The service becomes very good." It is assumed that a hashtag "#network connection" is associated with this first comment. As described in Modification Example 3, the latter first sentence of this first comment includes the opinion word "very good," but does not include the aspect term. The supplement module 108 acquires "network connection" included in the hashtag as the aspect term.

The supplement method of the supplement module 108 is not limited to the above-mentioned example. For example, it is assumed that the user inputs, as a post on the SNS, a first comment such as "I went to XYZ mobile shop. The network connection becomes . . . " It is assumed that a hashtag "#very good" is associated with this first comment. As described in Modification Example 3, the latter first sentence of this first comment does not include an opinion word. The supplement module 108 may acquire "very good" included in the hashtag as the opinion word.

The sentiment analysis system 1 according to Modification Example 4 supplements the another element based on the hashtag associated with the first comment. As a result, the accuracy of the supplement for the another element increases when the first sentence is incomplete. For example, even when the first sentence is an incomplete first sentence not including an aspect term, it is possible to supplement the first sentence with the aspect term acquired from the hashtag associated with the first sentence. For example, even when the first sentence is an incomplete first sentence not including an opinion word, it is possible to supplement the first sentence with the opinion word acquired from the hashtag associated with the first sentence.

5-5. Modification Example 5

For example, in the at least one embodiment and Modification Example 1 to Modification Example 4, the case in which the sentiment analysis is executed for the first sentence is described, but the sentiment analysis for the second sentence may be executed. As the sentiment analysis for the second sentence, it is only required to replace the portions described as "first sentence" in the description of the sentiment analysis module 106 in the at least one embodiment and Modification Example 1 to Modification Example 4 by "second sentence." The sentiment analysis module 106 is only required to execute the sentiment analysis for the first sentence or the second sentence. The sentiment analysis module 106 may execute the sentiment analysis for both of the first sentence and the second sentence.

The sentiment analysis module 106 analyzes sentiment in the second sentence based on the topic word. For example, the sentiment analysis module 106 analyzes the sentiment by determining whether or not a topic word is included in the second sentence. When it is determined that a topic word is included in the second sentence, the sentiment may be analyzed by acquiring another element based on another portion which is included in the second sentence and is other than the portion of this topic word. For example, the sentiment analysis module 106 acquires, as the another element, a dependency word having a dependency relationship with the topic word included in the second sentence from the another portion. It is only required that this processing be executed while the portions described as "first sentence" in the at least one embodiment are replaced by "second sentence."

For example, as in Modification Example 2, the second comment may be an answer to a question. For example, as in Modification Example 3, the supplement module 108 may supplement the another element of the second sentence based on the another element acquired from a third sentence including content similar to that of the second sentence. For example, as in Modification Example 4, classification information exemplified by the hashtag may be associated with the second comment. As the method of supplementing a lacking element when the second comment is incomplete, it is only required to replace the portions described as "first sentence" in the description of Modification Example 2 to Modification Example 4 by "second sentence."

The sentiment analysis system 1 according to Modification Example 5 analyzes the sentiment in the second sentence. As a result, the sentiment analysis in the second sentence can be executed by using the topic word acquired based on the first comment.

Moreover, the sentiment analysis system 1 analyzes the sentiment by determining whether or not the sentiment word is included in the second sentence. As a result, the sentiment analysis for the second sentence including the topic word representing the cluster C can be executed, and hence the accuracy of the sentiment analysis increases.

5-6. Modification Example 6

For example, when the sentiment in the second sentence is analyzed as in Modification Example 5, the sentiment analysis module 106 trains the sentiment analysis model M2 for analyzing the sentiment based on the topic word. The sentiment analysis model M2 is an example of a machine learning model which uses a machine learning method. Thus, portions described as "sentiment analysis model M2" can be replaced by "machine learning model."

For example, the sentiment analysis model M2 may use any one method of the supervised learning, the semi-supervised learning, and the unsupervised learning. In the at least one embodiment, the sentiment analysis model M2 which uses the method called "BERT" is exemplified, but the sentiment analysis model M2 may use another method other than the BERT such as the Transformer or the neural network. For example, the sentiment analysis model M2 may use a method called "Q&A base model."

The sentiment analysis model M2 has learned training data which is a pair of a first sentence and an aspect term, an opinion word, and a polarity acquired from the first sentence. As a method of acquiring the aspect term, the opinion word, and the polarity from the first sentence, the same method as the method described in the at least one embodiment may be used. The training data may manually be created or may automatically be created through use of a publicly-known tool. For example, parameters of the sentiment analysis model M2 are adjusted such that, when the first sentence is input, the aspect term, the opinion word, and the polarity acquired from the first sentence are output. As the learning method itself for the sentiment analysis model M2, various methods used in the machine learning method can be used.

For example, the sentiment analysis module 106 analyzes the sentiment based on the trained sentiment analysis model M2 and the second sentence. The sentiment analysis module 106 inputs the second sentence into the trained sentiment analysis model M2. The sentiment analysis model M2 calculates a feature vector of the second sentence, and outputs an aspect term, an opinion word, and a polarity corresponding to the feature vector. The sentiment analysis module 106 analyzes the sentiment by acquiring the aspect term, the opinion word, and the polarity output from the sentiment analysis model M2.

The sentiment analysis system 1 according to Modification Example 6 trains the sentiment analysis model M2 for analyzing the sentiment based on the topic word. The sentiment analysis system 1 analyzes the sentiment based on the trained sentiment analysis model M2 and the second sentence. As a result, the accuracy of the sentiment analysis for the second sentence increases.

5-7. Other Modification Examples

For example, the modification examples described above may be combined with one other.

For example, the functions described as implemented in the server 10 may be implemented in the user terminal 20 or another computer, or may be distributed to a plurality of computers. For example, the processing may be distributed to a plurality of computers such that the comment acquisition module 101 is implemented by a first computer, the morphological analysis module 102 and the conjoining module 103 are implemented by a second computer, and the clustering execution module 104, the topic word acquisition module 105, and the sentiment analysis module 106 are implemented by a third computer.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A sentiment analysis system, comprising at least one processor configured to: acquire a first comment which relates to a service, and which is input by a user who uses the service; execute clustering relating to the first comment based on the sentiment word of each of a plurality of clusters and a relevant word associated with a predetermined topic;

wherein the at least one processor is configured to execute clustering using a k-means clustering method; acquire a sentiment word relating to a sentiment about the service based on an execution result of the clustering; analyze the sentiment in a first sentence included in the first comment based on the sentiment word, analyze the sentiment by determining whether the sentiment word is included in the first sentence; wherein the sentiment is expressed by a plurality of elements including the sentiment word and another element relating to the sentiment word; wherein, when the sentiment word is determined to be included in the first sentence, the at least one processor is configured to analyze the sentiment by acquiring the another element based on another portion which is included in the first sentence and is other than a portion of the sentiment word; calculate a cosine similarity between a feature vector of the sentiment word of each of the plurality of clusters and a feature vector of the relevant word; add, as a label, a topic associated with the relevant word to the cluster among the plurality of clusters with the highest cosine similarity; and analyze the sentiment further based on the label.

2. The sentiment analysis system according to claim 1, wherein the at least one processor is configured to analyze the sentiment in the first sentence based on the sentiment word.

3. The sentiment analysis system according to claim 1, wherein the at least one processor is configured to:
execute the clustering relating to the first sentence based on a feature relating to the first sentence; and
acquire the sentiment word for each cluster relating to the first sentence.

4. The sentiment analysis system according to claim 1, wherein the at least one processor is configured to acquire from the another portion, as the another element, a dependency word having a dependency relationship with the sentiment word included in the first sentence.

5. The sentiment analysis system according to claim 4,
wherein the plurality of elements include the sentiment word, the dependency word, and a polarity of the sentiment, and
wherein the at least one processor is configured to analyze the sentiment by acquiring the polarity based on at least one of the sentiment word or the dependency word.

6. The sentiment analysis system according to claim 1, wherein the at least one processor is configured to acquire a plurality of candidate words relating to the sentiment word for each cluster based on the execution result of the clustering, and to acquire the sentiment word from the plurality of candidate words.

7. The sentiment analysis system according to claim 6, wherein the at least one processor is configured to calculate, for each of the plurality of candidate words, an appearance frequency relating to the each of the plurality of candidate words, and to acquire the sentiment word based on the appearance frequency.

8. The sentiment analysis system according to claim 1, wherein the at least one processor is configured to:
execute morphological analysis for the first sentence;
wherein the morphological analysis comprises:
decomposing the first sentence into a plurality of morphemes;
identifying a part of speech of each of the plurality of morphemes;
conjoin, when a plurality of nouns continuous to each other are included in the plurality of morphemes acquired from the first sentence, the plurality of nouns to acquire a conjoined noun;
acquire a plurality of feature vectors of the first sentence based on the conjoined noun;
execute the clustering based on the conjoined noun and obtain a plurality of candidate words;
calculate an appearance frequency of each of the candidate words using a term frequency-inverse document frequency method; and
acquire a topic word having the appearance frequency above a threshold from among the plurality of candidate words.

9. The sentiment analysis system according to claim 1, wherein the at least one processor is configured to: estimate, for each cluster, based on the sentiment word of the each cluster and a relevant word associated with a predetermined topic, whether the each cluster relates to a predetermined topic; and analyze the sentiment based on a result of the estimation.

10. The sentiment analysis system according to claim 1, wherein the at least one processor is configured to supplement the another element based on a predetermined supplement method when the another element is not acquired from the another portion.

11. The sentiment analysis system according to claim 10,
wherein the first comment is an answer to a question, and
wherein the at least one processor is configured to supplement the another element based on content of the question.

12. The sentiment analysis system according to claim 10, wherein the at least one processor is configured to supplement the another element of the first sentence based on the another element acquired from a third sentence including content similar to content of the first sentence.

13. The sentiment analysis system according to claim 10,
wherein a classification relating to the first comment is associated with the first comment, and
wherein the at least one processor is configured to supplement the another element based on the classification.

14. The sentiment analysis system according to claim 1, wherein the at least one processor is configured to analyze the sentiment in one of the first sentence included in the first comment or a second sentence included in a second comment based on the sentiment word.

15. The sentiment analysis system according to claim 14, wherein the at least one processor is configured to analyze the sentiment in the second sentence based on the sentiment word.

16. The sentiment analysis system according to claim 14, wherein the at least one processor is configured to analyze the sentiment by determining whether the sentiment word is included in the second sentence.

17. The sentiment analysis system according to claim 1, wherein the at least one processor is configured to estimate a polarity of the first sentence using a machine learning model which uses a bidirectional encoder representations from transformers method.

18. A sentiment analysis method, comprising: acquiring a first comment which relates to a service, and which is input by a user who uses the service; executing clustering relating to the first comment based on the sentiment word of each of a plurality of clusters and a relevant word associated with a predetermined topic; wherein the clustering is executed using a k-means clustering method; acquiring a sentiment word relating to a sentiment about the service based on an execution result of the clustering; analyzing the sentiment in a first sentence included in the first comment based on the sentiment words analyzing the sentiment by determining whether the sentiment word is included in the first sentence;

wherein the sentiment is expressed by a plurality of elements including the sentiment word and another element relating to the sentiment word; wherein, when the sentiment word is determined to be included in the first sentence, analyzing the sentiment by acquiring the another element based on another portion which is included in the first sentence and is other than a portion of the sentiment word; calculate a cosine similarity between a feature vector of the sentiment word of each of the plurality of clusters and a feature vector of the relevant word; add, as a label, a topic associated with the relevant word to the cluster among the plurality of clusters with the highest cosine similarity; and analyze the sentiment further based on the label.

19. A non-transitory information storage medium having stored thereon a program for causing a computer to: acquire a first comment which relates to a service, and which is input by a user who uses the service; execute clustering relating to the first comment based on the sentiment word of each of a plurality of clusters and a relevant word associated with a predetermined topic; wherein the at least one processor is configured to execute clustering using a k-means clustering method; acquire a sentiment word relating to a sentiment about the service based on an execution result of the clustering; analyze the sentiment in a first sentence included in the first comment based on the sentiment word, analyze the sentiment by determining whether the sentiment word is included in the first sentence; wherein the sentiment is expressed by a plurality of elements including the sentiment word and another element relating to the sentiment word; wherein, when the sentiment word is determined to be included in the first sentence, the at least one processor is configured to analyze the sentiment by acquiring the another element based on another portion which is included in the first sentence and is other than a portion of the sentiment word; calculate a cosine similarity between a feature vector of the sentiment word of each of the plurality of clusters and a feature vector of the relevant word; add, as a label, a topic associated with the relevant word to the cluster among the plurality of clusters with the highest cosine similarity; and analyze the sentiment further based on the label.

* * * * *